US008051940B2

(12) United States Patent
Ziech

(10) Patent No.: US 8,051,940 B2
(45) Date of Patent: Nov. 8, 2011

(54) HYDRAULIC ASSIST WHEEL END

(75) Inventor: James F. Ziech, Kalamazoo, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 832 days.

(21) Appl. No.: 12/156,078

(22) Filed: May 29, 2008

(65) Prior Publication Data

US 2009/0230649 A1    Sep. 17, 2009

Related U.S. Application Data

(60) Provisional application No. 61/036,670, filed on Mar. 14, 2008.

(51) Int. Cl.
*B60K 17/30* (2006.01)

(52) U.S. Cl. ........ 180/253; 180/254; 180/255; 180/256; 180/257; 180/259; 180/260; 180/261; 180/62; 180/63; 180/305; 180/308; 280/93.512

(58) Field of Classification Search .......... 180/253–263, 180/6.48, 305, 308; 280/93.512
See application file for complete search history.

(56) References Cited

U.S. PATENT DOCUMENTS

| | | | | |
|---|---|---|---|---|
| 3,225,855 A * | 12/1965 | Sherwen | ........................ | 180/253 |
| 3,469,648 A * | 9/1969 | Cannon | ........................ | 180/261 |
| 3,581,682 A | 6/1971 | Kontranowski | | |
| 3,605,931 A | 9/1971 | Firth et al. | | |
| 3,612,204 A | 10/1971 | Allen | | |
| 3,865,207 A * | 2/1975 | Schwab et al. | ................ | 180/253 |
| 4,111,618 A | 9/1978 | Thibault | | |
| 4,162,713 A | 7/1979 | Heitman et al. | | |
| 4,171,732 A | 10/1979 | Pinson | | |
| 4,201,279 A | 5/1980 | Fukui | | |
| 4,352,406 A | 10/1982 | Fahrenschon | | |
| 4,356,773 A | 11/1982 | van Eyken | | |
| 5,087,229 A * | 2/1992 | Hewko et al. | .................. | 475/149 |
| 5,181,579 A | 1/1993 | Gilliem | | |
| 5,472,062 A | 12/1995 | Nagai et al. | | |
| 6,302,233 B1 * | 10/2001 | Okamuro et al. | ............. | 180/253 |
| 6,902,027 B2 | 6/2005 | Soga et al. | | |
| 7,231,999 B2 | 6/2007 | Phillips | | |
| 7,302,979 B2 * | 12/2007 | Davison et al. | ................ | 152/417 |
| 7,353,904 B2 * | 4/2008 | Phillips | ......................... | 180/253 |
| 7,591,338 B2 * | 9/2009 | Irikura | ........................ | 180/242 |

FOREIGN PATENT DOCUMENTS

EP    0 505 727 A1    2/1992

* cited by examiner

*Primary Examiner* — Paul N Dickson
*Assistant Examiner* — Marlon Arce
(74) *Attorney, Agent, or Firm* — Marshall & Melhorn LLC

(57) ABSTRACT

A steerable vehicle knuckle has an inboard portion defining upper and lower arms, with a kingpin between them, and has an outboard portion defining a spindle that cooperates with a fluid driven motor. The arms define a cavity where an axle end portion is pivotally received. Fluid supply ports, which supply fluid to energize the motor, are located on an upper surface of the knuckle's inboard portion. Fluid drain lines extend within the knuckle from the motor to the cavity and are utilized to drain fluid from the motor. The supply ports and drain lines are each connected to separate hoses formed in a small arc that follows closely the circular curvature of the kingpin. This arrangement of port, lines, and hoses is less expensive to produce, easier to package, more robust, allows for faster steering reaction, and is easier to assemble than conventional arrangements.

13 Claims, 3 Drawing Sheets

HYDRAULIC ASSIST WHEEL END

RELATED APPLICATION

This application claims the benefit under 35 U.S.C. §119 (e) of U.S. Provisional Application No. 61/036,670 filed Mar. 14, 2008, the entirety of which is hereby incorporated by reference.

FIELD OF THE INVENTION

The present invention relates to a vehicle knuckle that is adapted to cooperate with a fluid driven motor. More particularly, the present invention relates to a steerable vehicle knuckle with an inventive fluid supply, return and drain lines and other fluid paths for communicating fluid to and from a fluid driven motor.

BACKGROUND OF THE INVENTION

Those skilled in the art know that some vehicles, such as trucks, farm vehicles, and heavy duty construction vehicles, have wheels that are driven by hydraulic drive motors located at the wheels. Typically, each wheel end has a knuckle that utilizes a plurality of large hydraulic fittings that function as supply, return and drain ports. The ports are typically located all about the knuckle. Hoses, which are connected to these fittings at these locations, are required to traverse a large arc when the axle is steered. Such an arrangement of fittings and hoses, however, is difficult to package within the vehicle and uses large amounts of hose material.

A few examples of methods of providing fluid to a hydraulically driven wheel include devices described in the following patents. U.S. Pat. No. 4,171,732 discloses a fluid supply port on an upper surface of an inboard portion of a knuckle. The fluid return port, however, is located on a lower surface of the inboard portion. This design causes significant problems in packaging the hoses attached to these ports. Additionally, the fluid return hose, being located below the spindle, is highly susceptible to damage from items on the ground and from the ground itself.

U.S. Pat. No. 3,612,204 teaches a rigid fluid supply and return lines fixedly attached to an upper portion of a boss. The motor may pivot about the boss to provide steering to a wheel. As can be appreciated by FIG. 7 of this patent, the fixed fluid lines take up a tremendous amount of space at the wheel end.

U.S. Pat. No. 4,111,618 discloses supply and return lines all entering the spindle substantially parallel with the spindle centerline. The supply lines are located above/below the drain line, the drain line is at the centerline. All fluid lines are arranged about the centerline of the spindle and enter the spindle at this point as well.

As can be appreciated from the above discussion, some designs require a large amount of hose material and require that the fluid hoses traverse a large arc when the axle steers, which is difficult to package. Thus, a vehicle having hydraulic hoses connected to a wheel end having a hydraulic motor disposed thereon, may benefit from an arrangement of hydraulic hoses that does not require a large amount of hose material and does not require a wide arc for the hoses to traverse when the wheel end is steered in various directions. Such an arrangement would be less expensive to produce, easier to package, more robust, allow for faster steering reaction, and would be more easily connectable at the time of assembly of the vehicle.

SUMMARY OF THE INVENTION

A vehicle knuckle is disclosed that has an inboard portion that defines an upper arm and a lower arm. The knuckle also has an outboard portion that defines a spindle. The outboard portion is adapted to cooperate with a fluid driven motor. The arms define a cavity where an end portion of an axle is pivotally received. A connecting wall of the cavity connects an upper wall and a lower wall, also of the cavity, together. Fluid supply ports are located on an upper surface of the upper arm of the inboard portion adjacent the upper wall of the cavity for communicating fluid to the motor. Fluid drain lines are oriented substantially parallel one another near a centerline of the knuckle for draining fluid from the motor. The drain lines extend from the outboard portion to ports located in the connecting wall of the cavity.

Further advantages of the present invention will be apparent from the following description and appended claims, reference being made to the accompanying drawings forming a part of a specification, wherein like reference characters designate corresponding parts of several views.

DETAILED DESCRIPTION OF THE INVENTION

It is to be understood that the present invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions, directions, or other physical characteristics relating to the embodiments disclosed are not to be considered as limiting, unless the claims expressly state otherwise.

Figure 1:
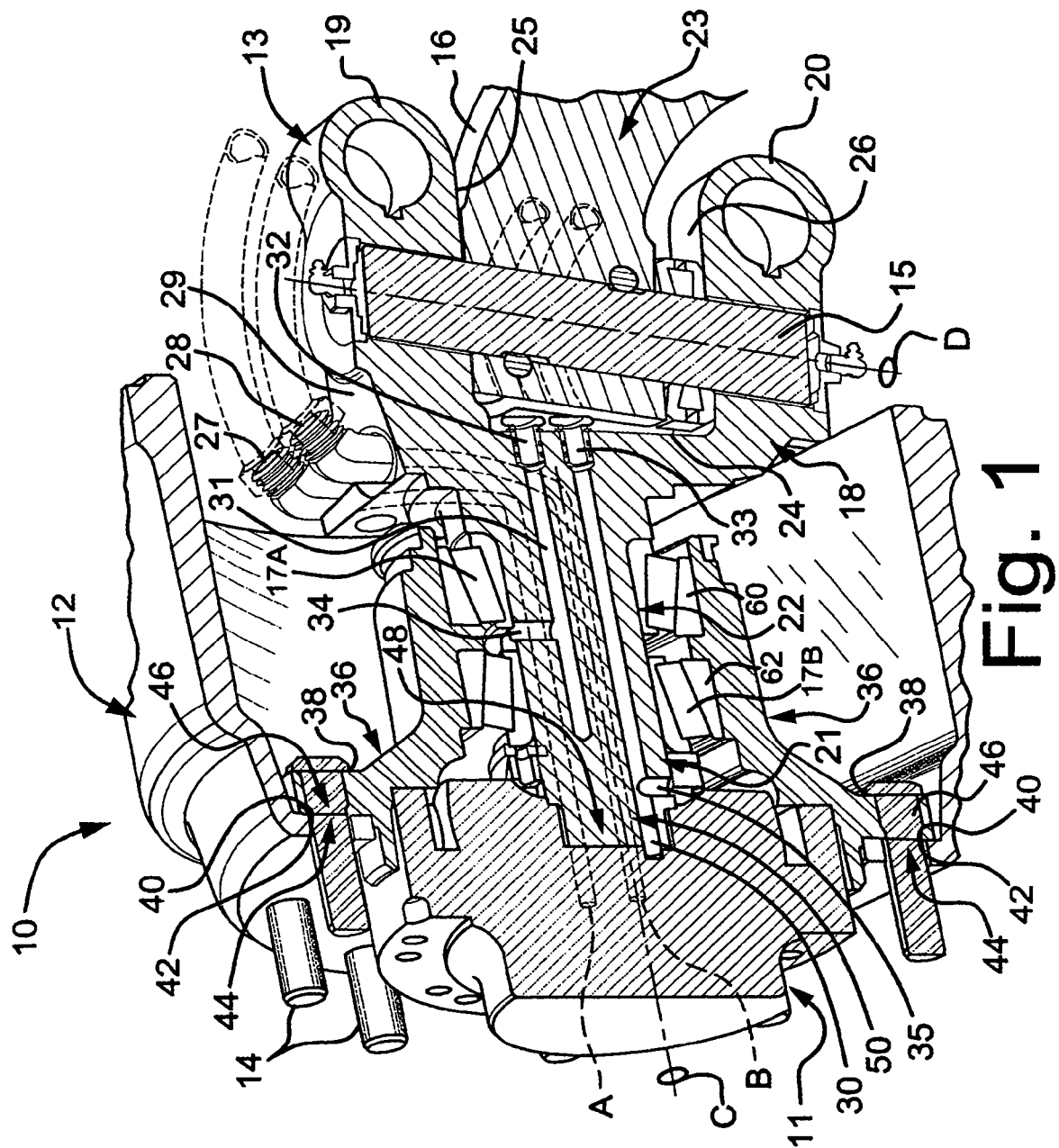
FIG. 1 is a three dimensional cut away view of a vehicle hydraulic assist wheel end in accordance with the present invention.

Illustrated in FIG. 1 is a hydraulic assist wheel end 10 that comprises a motor 11, a wheel drum 12, and a steerable knuckle 13. A hub 36 is rotatably mounted radially outboard to the knuckle 13. The hub 36 is drivingly connected to the motor 11 so that when the motor 11 is energized, it causes the hub 36 to rotate. The motor 11 may be such as those produced by Poclain Hydraulics Industrie of France.

The hub 36 has a bolt flange 38 with a plurality of bolt apertures 40. The wheel drum 12 is located radially outward from the hub 36. The drum 12 has a bolt flange 42 that abuts the bolt flange 38 of the hub 36. The drum bolt flange 42 has a plurality of apertures 44 that align with the apertures in the hub bolt flange apertures 46. Bolts 14 are located through the hub bolt flange apertures 46 and the drum bolt flange apertures 44 to fixedly connect the hub 36 and the wheel drum 12.

The hub 36 and the drum 12 rotate about the centerline C of the knuckle 13 by way of bearings 17A, 17B which are located between the knuckle 13 and the hub 36.

The knuckle 13 has an inboard portion 18 that defines an upper arm 19 and a lower arm 20. A kingpin 15, which is located between the upper arm 19 and the lower arm 20 pivotably connects an end portion of an axle 16 of a vehicle (not shown) to the knuckle inboard portion 18, permits the vehicle to be steered about a centerline D of the kingpin 15.

The knuckle 13 also has an outboard portion 21 that defines a spindle 22. The outboard portion 21 is adapted to cooperate with the fluid driven motor 11. Preferably, the motor 11 has a circular recess 48 for receiving the outboard portion 21 of the cylindrical spindle 22.

The arms 19, 20 define a cavity 23 where the end portion of the axle 16 is pivotally received. A knuckle connecting wall 24 connects a knuckle upper wall 25 and a knuckle lower wall 26 together.

A first fluid pressure supply port 27 and a second fluid pressure supply port 28 are located on an upper surface 29 of the upper arm 19 of the knuckle inboard portion 18 radially outward from the upper wall 25 of the knuckle 13 for communicating fluid to the motor 11. Fluid flowing through the first pressure supply port 27, via pressure supply line A (hidden), rotates the motor 11 in a first direction, thus causing the wheel drum 12 to move, for example, in a forward direction.

Alternatively, fluid may be communicated to the motor 11 through pressure supply line B via second pressure supply port 28. In this case, the motor 11 would rotate in a second direction, opposite the first direction, thus causing the wheel assembly to move, for example, in a rearward direction.

Two fluid return drain lines 30, 31 are oriented substantially parallel one another near the centerline C of the knuckle 13 for draining fluid from the motor 11. The lines 30, 31 extend from the outboard portion 21 to ports 32, 33 located in the connecting wall 24 of the knuckle 13. Line 30 is shown draining hydraulic fluid from the motor 11 and a portion of the knuckle 13, while line 31 is shown draining hydraulic fluid from another portion of the knuckle 13. Although not shown in the particular cut away of FIG. 1, line 31 is also in direct fluid communication with the motor 11 itself. The lines 30, 31 may be connected to a sump system (not shown).

A first internal drain port 34 is preferably located between the inner bearing 17A and the outer bearing 17B. The internal drain port 34 is substantially oriented perpendicularly to the return drain line 31. The internal drain port 34 can be utilized to drain fluid to the return drain line 31.

A second internal drain port 35 is located outboard of the outer bearing 17B. The internal drain port 35 is substantially oriented perpendicularly to the return drain line 30. The internal drain port 35 can be utilized to drain fluid to the return drain line 30.

As a result of locating the fluid pressure supply ports 27, 28 on the upper surface 29 of the upper arm 19, close to the periphery of the kingpin 15 about the kingpin steer axis centerline D, the supply ports 27, 28 would be connected to supply hoses that are shown as hidden lines in FIG. 1. Here, the supply hoses are formed in a small travel arc that follows closely the circular curvature of the kingpin 15.

Also, as a result of disposing the drain lines 30, 31 parallel to the centerline C of the knuckle 13, the drain ports 32, 33 would be connected to drain hoses that are shown as hidden lines in FIG. 1. Here, the drain hoses are formed in a small travel arc that follows closely the circular curvature of the kingpin 15.

Thus, the supply and drain hoses would effectively allow the hydraulic assist wheel end 10 to pivot about the kingpin steer axis centerline D when the vehicle is being steered.

By reducing the travel arc for these hoses, the space (area) taken up by the hoses is greatly reduced. It can be appreciated that since the hoses do not travel through a large arc when the spindle is turned, that less hose material can be used. Thus, less drain hose material is required to accomplish the same function as the prior art designs. Additionally, by locating both of the supply hoses together on an upper surface 29 of the upper arm 19 of the knuckle 13, the hoses are prevented from coming in contact with the ground or obstacles on, propelled from, or protruding from the ground that may damage the hoses. Also, the pressure supply ports 27, 28 are at least prevented from being damaged in the same ways.

Figure 2:
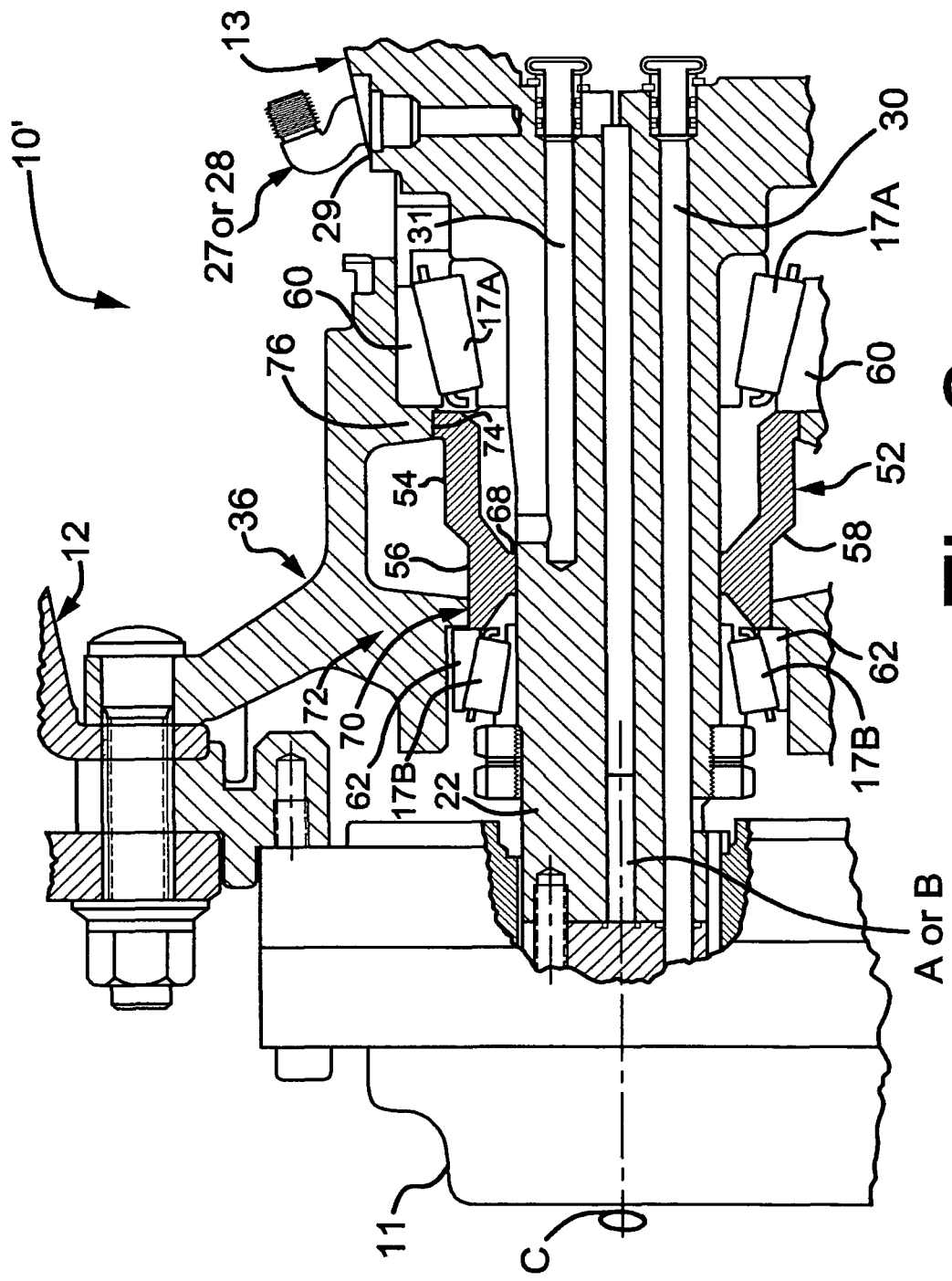
FIG. 2 is a partial cross-sectional view of an alternate embodiment of a vehicle hydraulic assist wheel end in accordance with the present invention.

FIG. 2 illustrates an alternate embodiment vehicle hydraulic assist wheel end 10' with the motor 11, the wheel drum 12, the knuckle 13, the hub 36, and the inner bearing 17A and the outer bearing 17B.

The fluid pressure supply port 27 or 28 is also shown connected to its corresponding supply line A/B and located on the upper surface 29.

Also shown is a first spacer 52 disposed between and abutting an outer race 60 of the inner bearing 17A and also an outer race 62 of the outer bearing 17B. The spacer 52 has an inner landing 54 and an outer landing 56 with an angled landing portion 58 therebetween.

An outboard portion 70 of the outer landing 56 is also in contact with an inwardly extending portion 72 of the hub 36. The outer race 62 of the outer bearing 17B is seated within the inwardly extending portion 72 of the hub 36.

An inboard portion of 74 of the inner landing 54 is also in contact with an inwardly extending portion 76 of the hub 36. The outer race 60 of the inner bearing 17A is seated within the inwardly extending portion 74 of the hub 36.

The inner landing 54 has a greater outer diameter than an outer diameter of the outer landing 56. Thus, the function of the angled landing portion 58 is to connect the landings 54, 56.

The spacer also comprises an inwardly disposed surface 68 that extends radially inward from the land 56. The inside diameter surface 68 extends radially inwardly in close proximity clearance to the spindle 22 outside diameter.

Spacers 52 of various sizes may be used, which at least permits the use of the same spindle 12 and motor 11 while adapting to wheel assemblies of varying sizes. The vehicle hydraulic assist wheel end 10 of FIG. 1 has no spacer disposed between and abutting the races 60, 62. Preferably, the spacer 52 is unitary and one piece.

Figure 3:
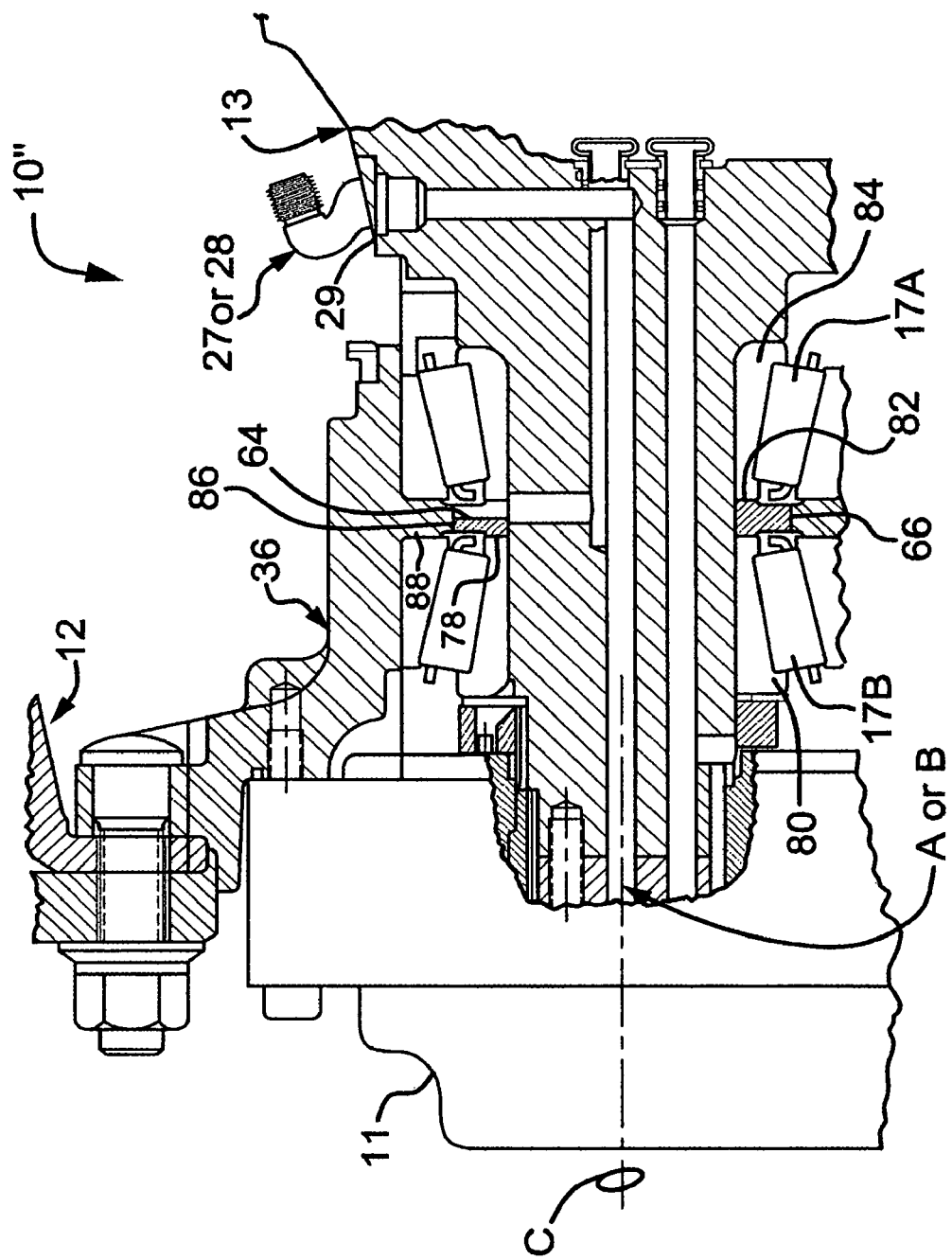
FIG. 3 is a partial cross-sectional view of a second alternate embodiment of a vehicle hydraulic assist wheel end in accordance with the present invention.

FIG. 3 illustrates a second alternate embodiment vehicle hydraulic assist wheel end 10" with the motor 11, the wheel drum 12, the knuckle 13, the hub 36, and the inner bearing 17A and the outer bearing 17B.

The fluid pressure supply port 27 or 28 is also shown connected to its corresponding supply line A/B and still located on the upper surface 29.

A second spacer 64 is located radially outward from the outboard portion 21 of the knuckle 13. The spacer 64 preferably has a flat outboard surface 78 in direct contact with an inner race 80 of the outboard bearing 17B. A flat inboard surface 82 is in direct contact with an inner race 84 of the inboard bearing 17A. A flat radially outermost surface 86 is in close proximity clearance 66 with an inwardly extending hub portion 88. In all embodiments, the bearings 17A, 17B rotatingly support the hub 36 about the knuckle 13. The second spacer 64 may be of a one piece, unitary construction.

Spacers 64 of various sizes may be used, which at least permits the use of the same spindle 12 and motor 11 while adapting to wheel assemblies of varying sizes. Preferably, the spacer 64 is of a unitary, one piece construction.

It is to be understood that the patent drawings are not intended to define precise proportions of the elements of the invention but that the patent drawings are intended to be utilized in conjunction with the rest of the specification. Unless expressly specified to the contrary, it should also be understood that the illustrated differences between various elements of the invention, which may be in fractions of a unit of measurement, are not intended to be utilized to precisely measure those differences between the various elements.

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. A steerable vehicle knuckle, comprising:
   an inboard portion defining an upper arm and a lower arm;
   an outboard portion defining a spindle, said outboard portion adapted to cooperate with a fluid driven motor;
   a cavity defined by said arms for pivotally receiving an axle end portion therein, said cavity having an upper wall, a lower wall and a connecting wall connecting them;
   fluid pressure supply ports located on an upper surface of said upper arm of said inboard portion adjacent said upper wall of said cavity for communicating fluid to said motor; and
   fluid return drain lines oriented substantially parallel one another near a centerline of said knuckle for draining fluid from said motor, said lines extending from said outboard portion to ports located in said connecting wall of said cavity.

2. The steerable vehicle knuckle of claim 1, wherein said fluid pressure supply ports comprise two fluid pressure supply ports and said fluid return drain lines comprise two fluid drain lines.

3. The steerable vehicle knuckle of claim 2, wherein said fluid pressure supply ports and said fluid return drain lines are each connected to separate hoses formed in a small arc that follows closely the circular curvature of the kingpin.

4. The steerable vehicle knuckle of claim 1, wherein said spindle is cylindrical in form that cooperates with a circular recess of said motor.

5. The steerable vehicle knuckle of claim 1, wherein a hub is rotatably mounted radially outboard from said knuckle, said hub drivingly connected to said motor, wherein when said motor is energized, said hub rotates.

6. The steerable vehicle knuckle of claim 5, wherein said hub has a hub bolt flange and a wheel drum has a drum bolt flange, said bolt flanges adapted to fixedly connect said hub and said wheel drum, thereby said hub and said wheel drum rotate about the centerline of said knuckle by way of bearings located between said knuckle and said hub.

7. The steerable vehicle knuckle of claim 1, wherein a kingpin, located between said upper arm and said lower arm, pivotably connects said axle end portion of a vehicle to said knuckle.

8. The steerable vehicle knuckle of claim 1, further comprising fluid supply lines disposed within said knuckle connecting said fluid pressure supply ports to said motor.

9. A vehicle comprising said steerable vehicle knuckle of claim 1, said vehicle being a truck, a farm vehicle, or a construction vehicle.

10. A steerable vehicle knuckle, comprising:
    an inboard portion and an outboard portion defining a spindle, said outboard portion adapted to cooperate with a fluid driven motor;
    a cavity defined by said inboard portion, said cavity having an upper wall, a lower wall and a connecting wall connecting them;
    two fluid pressure supply ports, both located on an upper surface of said inboard portion, in fluid communication through separate fluid lines within said knuckle and extending from said ports to said motor through said inboard and outboard portions, wherein said lines have a vertical component and a horizontal component;
    two fluid return drain lines oriented substantially parallel one another near a centerline of said knuckle for draining fluid about said knuckle, wherein at least one of said lines extends from said outboard portion to a port located in said connecting wall of said cavity; and
    a spacer located radially outward from said outboard portion of said knuckle, said spacer having a first land and a second land, said second land having a greater diameter than said first land, wherein both of said lands are in contact with a hub located about said knuckle and said second land is in contact with an inner bearing located between said hub and said knuckle, said first land is in contact with an outer bearing located between said hub and said knuckle, and said spacer inside diameter surface extends radially inwardly in close proximity clearance to said spindle outside diameter.

11. The steerable vehicle knuckle of claim 10, wherein said spacer is of unitary construction.

12. A steerable vehicle knuckle, comprising:
    an inboard portion and an outboard portion defining a spindle, said outboard portion adapted to cooperate with a fluid driven motor;
    a cavity defined by said inboard portion, said cavity having an upper wall, a lower wall, and a connecting wall connecting them;
    two fluid pressure supply ports located on an upper surface of said inboard portion, both of said ports being in fluid communication through separate fluid lines extending from said ports to said motor through said inboard and outboard portions, wherein said lines have a vertical component and a horizontal component;
    two fluid return drain lines oriented substantially parallel one another near a centerline of said knuckle for draining fluid about said knuckle, wherein at least one of said lines extends from said outboard portion to a port located in said connecting wall of said cavity; and
    a spacer located radially outward from said outboard portion of said knuckle, said spacer having a flat outboard surface in direct contact with an inner race of an outboard bearing, a flat inboard surface in direct contact with an inner race of an inboard bearing and a flat radially outermost surface in close proximity clearance with an inwardly extending hub portion, wherein said bearings rotatingly supporting a hub about said knuckle.

13. The steerable vehicle knuckle of claim 12, wherein said spacer is of unitary construction.

\* \* \* \* \*